(No Model.) 6 Sheets—Sheet 1.
A. D. BAKER & F. P. HUYCK.
CONCENTRIC PISTON STEAM ENGINE.
No. 383,609. Patented May 29, 1888.
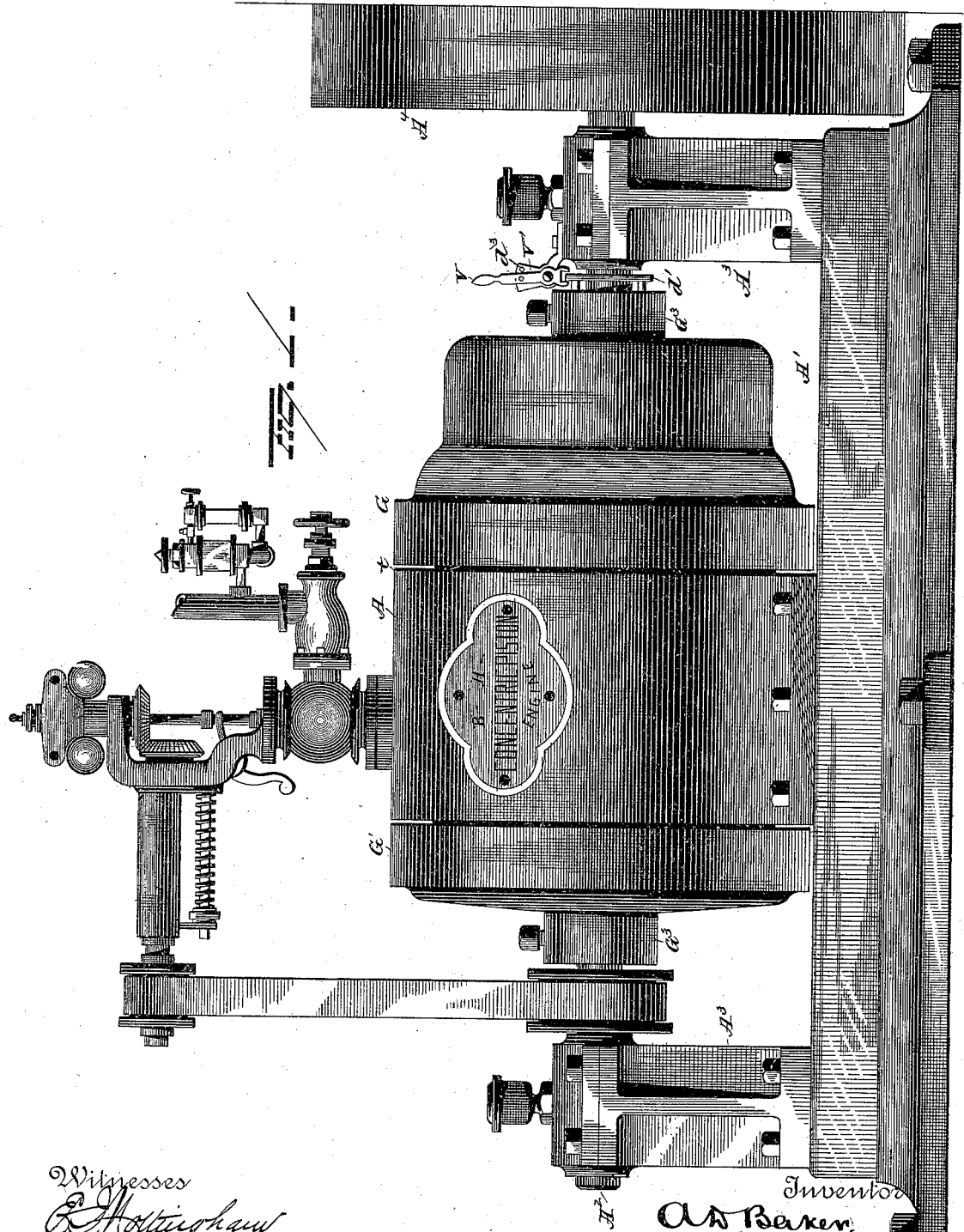

(No Model.) 6 Sheets—Sheet 2.
A. D. BAKER & F. P. HUYCK.
CONCENTRIC PISTON STEAM ENGINE.
No. 383,609. Patented May 29, 1888.
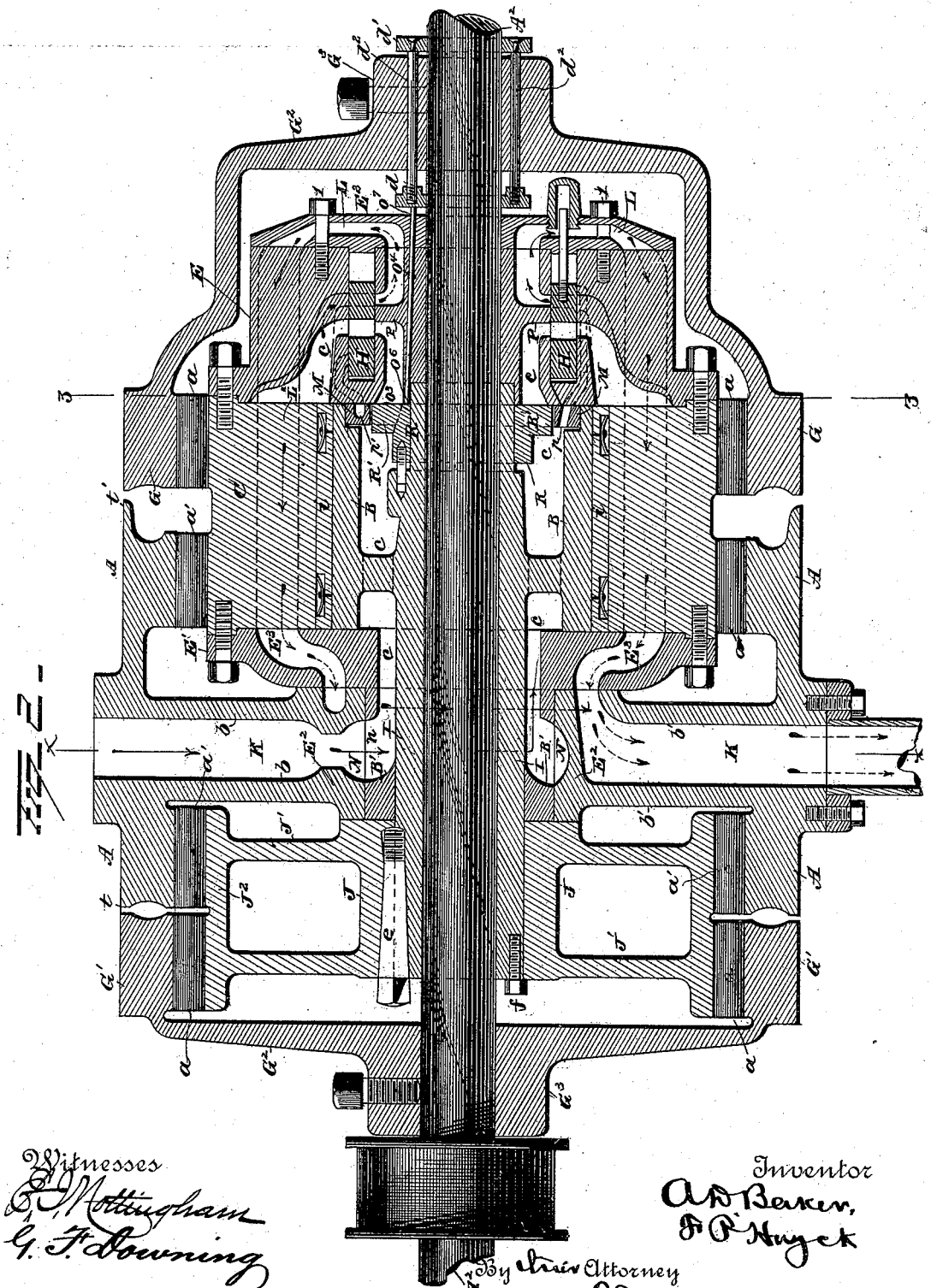

(No Model.) 6 Sheets—Sheet 3.
A. D. BAKER & F. P. HUYCK.
CONCENTRIC PISTON STEAM ENGINE.
No. 383,609. Patented May 29, 1888.
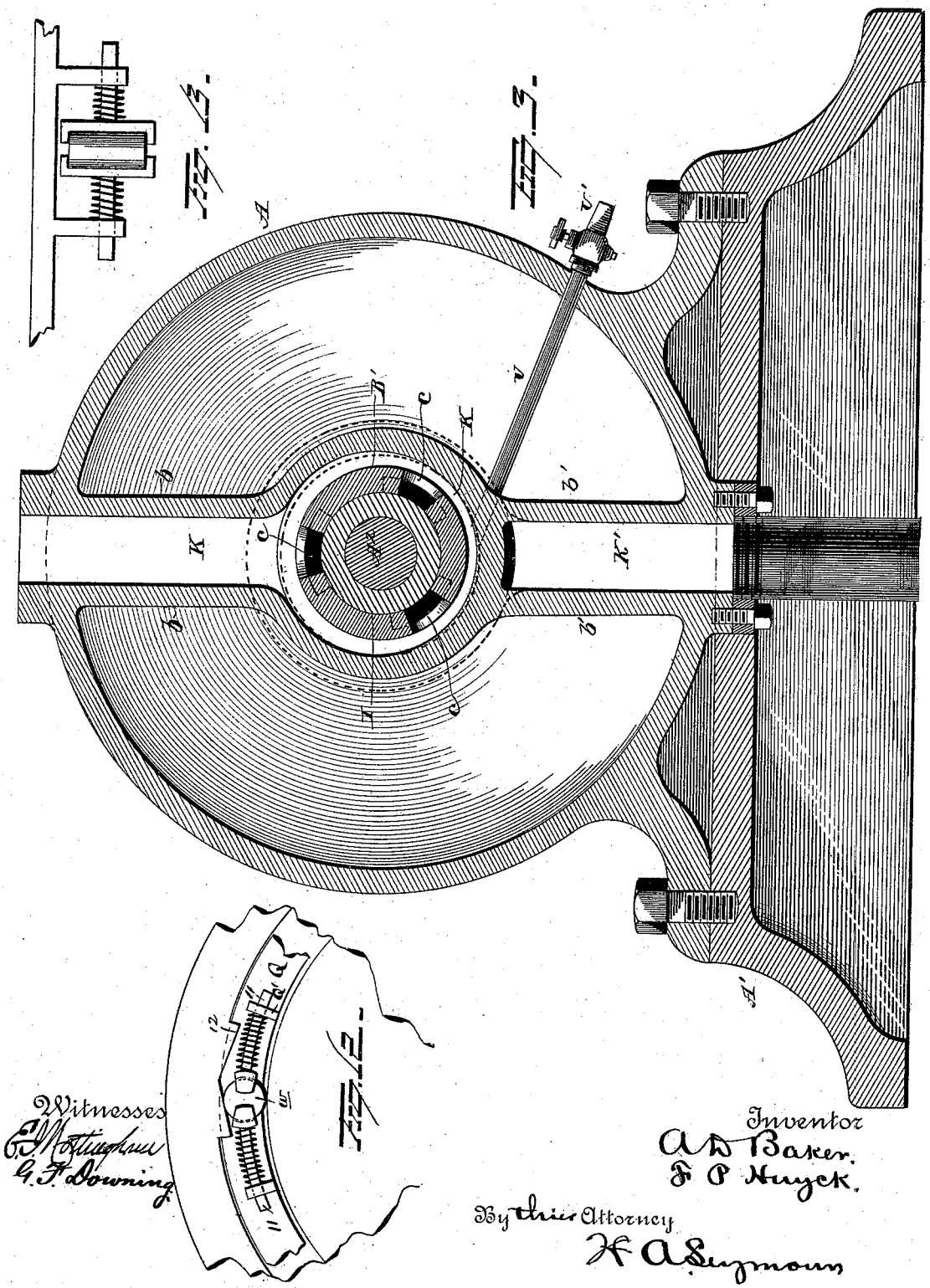

(No Model.) 6 Sheets—Sheet 4.
A. D. BAKER & F. P. HUYCK.
CONCENTRIC PISTON STEAM ENGINE.
No. 383,609. Patented May 29, 1888.
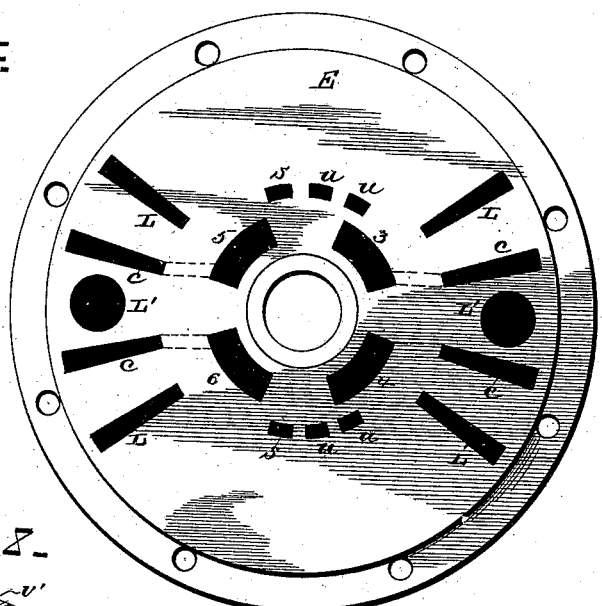

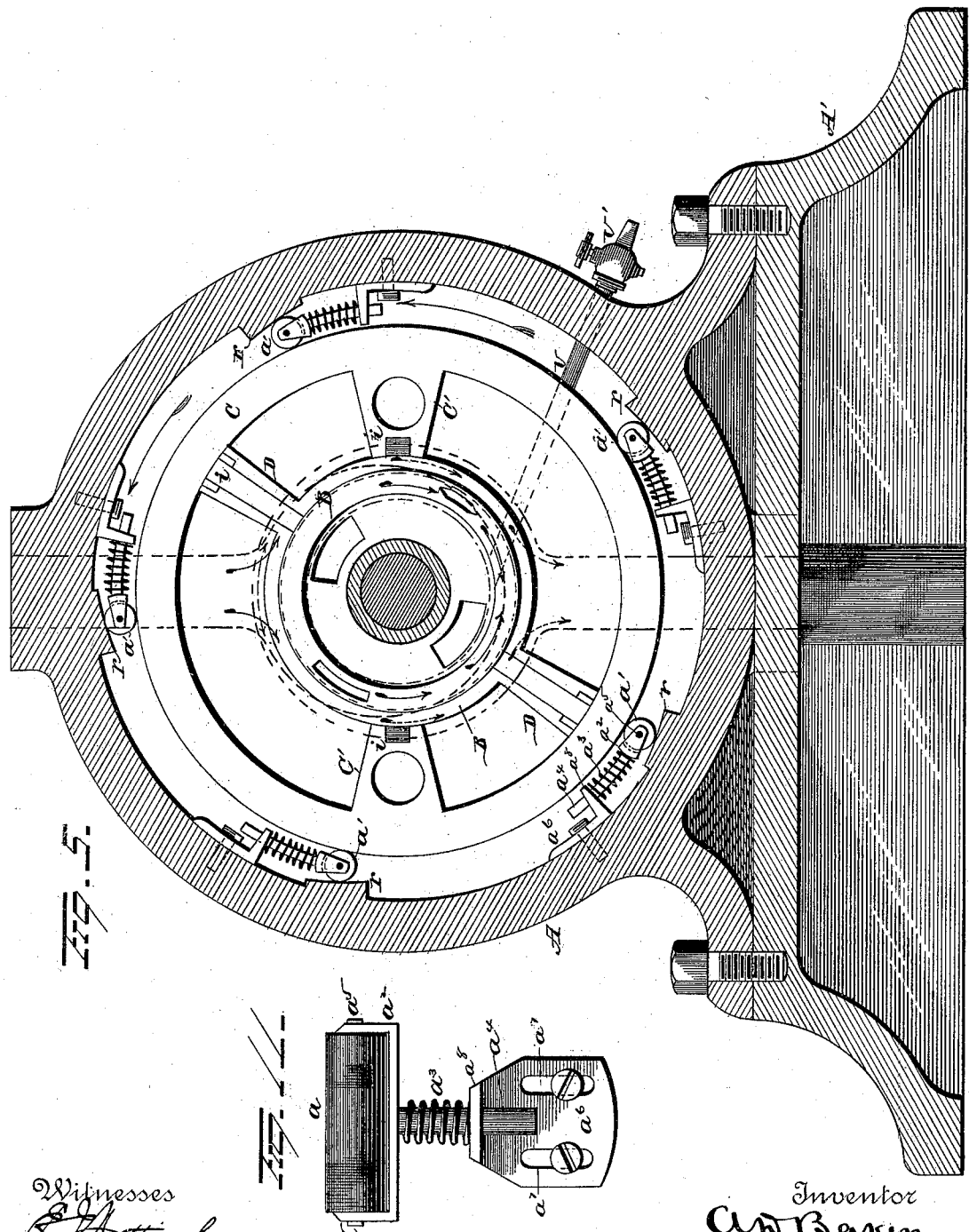

(No Model.) 6 Sheets—Sheet 6.
A. D. BAKER & F. P. HUYCK.
CONCENTRIC PISTON STEAM ENGINE.
No. 383,609. Patented May 29, 1888.
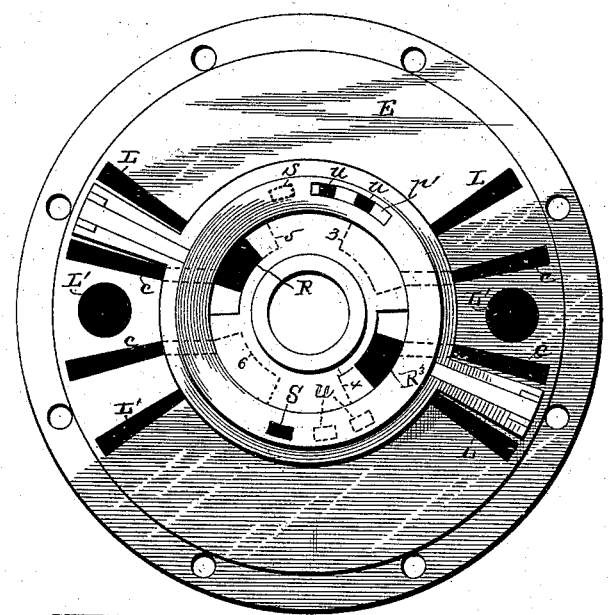
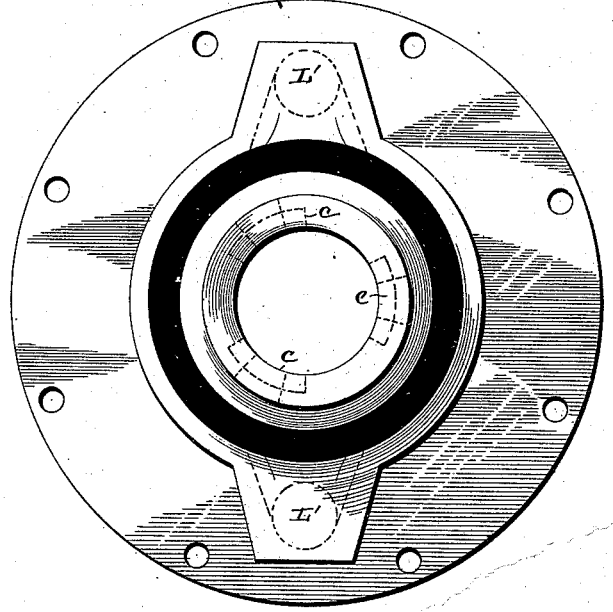
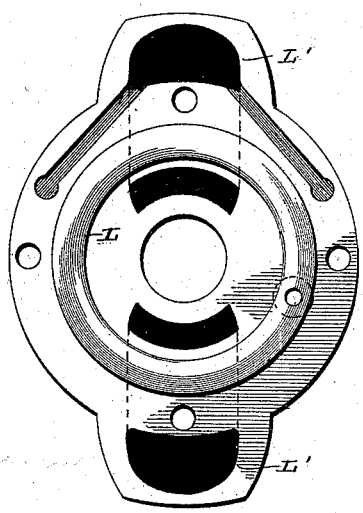

United States Patent Office.

ABNER D. BAKER AND FRANCIS P. HUYCK, OF SWANTON, ASSIGNORS OF ONE-THIRD TO ALBERT E. ROBERTS, OF NORWALK, OHIO.

CONCENTRIC-PISTON STEAM-ENGINE.

SPECIFICATION forming part of Letters Patent No. 383,609, dated May 29, 1888.

Application filed December 1, 1887. Serial No. 256,699. (No model.)

*To all whom it may concern:*

Be it known that we, ABNER D. BAKER and FRANCIS P. HUYCK, of Swanton, in the county of Fulton and State of Ohio, have invented certain new and useful Improvements in Concentric-Piston Steam-Engines; and we do hereby declare the following to be a full, clear, and exact description of the invention, such as will enable others skilled in the art to which it appertains to make and use the same.

Our invention relates to an improvement in rotary engines, and more particularly to a type known as "concentric piston engines."

In Patent No. 344,339, dated June 29, 1886, granted to us, the broad principles upon which the present invention is based are shown.

The object of our invention is to simplify and improve the construction of a concentric-piston engine, provide an automatic cut-off, as well as an improved steam-operated valve, and furnish a means for the instant reversal of motion of the engine-driving shaft.

With these objects in view our invention primarily consists in the provision of a central hub having radial or outwardly-extended pistons, a cylinder, loosely mounted, concentric with this hub, and furnished with radial pistons that project inwardly toward the central hub to engage it with their ends. The pistons of the hub, being alternated with the cylinder-pistons, have their ends in sliding contact with the inner surface of the cylinder. The pistons of the hub and cylinder are alternately moved in the same direction by the expansive action of steam, which is introduced through proper ports. The pistons affixed to the central hub and those attached to the concentric cylinder are alternately locked fast to and released from a stationary cylindrical shell, and also to two enveloping cylindrical shells, termed "disks," said disks being secured to the engine-shaft, which is the longitudinal axis of the working parts of the device, so that the alternate forward motion of the hub and cylinder-pistons on their axes will give a "step-by-step" continuous movement to the disks, and consequently a rotary motion to the attached engine-shaft.

Our invention also comprehends a means of prevention of end-thrust of the pistons against the cylinder-heads, so that the working parts of the engine are perfectly balanced, and frictional resistance is reduced to a minimum.

This invention further consists in the provision of a simple and novel form of sliding ring-valve, which is moved by the direct application of steam upon its ends, and is steam-cushioned against percussive action at each end of its reciprocal movement.

Our improved engine embodies a novel means for cutting off steam at a predetermined point to permit it to work by expansion, and also a provision for the instant removal of the cut-off valve from its seat to permit a full stroke of the pistons by direct continuous influx of live steam and pressure of the same upon the pistons. We also provide a means for the reversal of motion of the shaft of the engine, which may be run with equal speed and power in opposite directions when the engine is provided with this adjunctive feature.

Our invention further consists in certain features of construction and combinations of parts, that will be hereinafter described, and pointed out in the claims.

Referring to the drawings, Figure 1 is a front view of the complete engine. Fig. 2 is a side elevation, in section, of the engine, taken on an axial line through the shaft. Fig. 3 is a view in transverse section, taken on the line *x x*, (see Fig. 2,) or through the center of the steam inlet and exhaust main passages. Fig. 4 is a face view of the right-hand cylinder-head, which is also the valve-chest. Fig. 5 is a view in cross-section of the cylinder, taken on the line *z z*, Fig. 2. Fig. 6 represents the face of the right-hand cylinder-head with the hub-pistons in position for starting the engine at one end of stroke of the piston. Fig. 7 represents a view of the face of the cylinder-head which is attached to the left-hand end of the cylinder or head that contains the steam inlet and exhaust passages. Figs. 8 and 9 are sectional views of the sliding ring-valve or main valve of the engine. Fig. 10 is a view of the rear end of the right-hand cylinder-head, E, with the steam and exhaust passages shown in solid and dotted lines. Fig. 11 represents a detached view of one of the clutching-rollers and its bracket-frame. Figs. 12 and 13 are views of a modified form of the clutching device that is employed to afford a reverse motion to the engine. Fig. 14 is a face view of the end cap, E², of the right-hand cylinder-head, the cap being shown detached from the head.

The casing or outer shell, A, of the engine is mounted upon a suitable base, A', and secured thereto by bolts that are inserted through holes in its flanged lower edge. The shaft A² is supported to revolve freely in boxes mounted upon the bracket-stands A³, and a driving-pulley, A⁴, is secured to one end of the shafts, a pulley to drive a governor being placed upon the opposite end of the driving-shaft. (See Fig. 1.)

In Figs. 2 and 5, C represents the cylinder of the engine. Two radial winged abutments or pistons, C', are integrally formed or fixed to the inner surface, C, at opposite points. Within the cylinder C the piston-hub B is located. Formed upon or attached to the hub B are two oppositely-placed pistons, D. These are of a length that will permit them to bear steam-tight upon the inner surface of the cylinder, and the pistons C' are of the same length, so that their outer ends will have sliding contact with the surface of the hub B.

Suitable packing-strips, $i$, are inserted into grooves made to receive them in the side edges and ends of the pistons C' D, these packing-strips being seated upon elastic springs formed either of elliptical plates or spiral wire. The cylinder is provided with two heads, E E', which are bolted to the ends of the cylinder to form steam-tight joints therewith. Considered from the front of the engine, the cylinder-head E is located upon the right-hand end of the cylinder C, and is also a valve-chest, and in it the ports and steam and exhaust passages leading to and from the main valve are located. The head E', which is attached to the other end of the cylinder C, has its inner surface excavated to produce an annular groove, E³, which forms a continuation of the exhaust and live steam passages, that will be further explained.

The piston-hub B is integrally formed upon a concentric sleeve, I, which projects through the head E', this head having a sleeve-extension, B', made integral with it that fits neatly upon the sleeve I, as shown in Fig. 2. Upon the outer end of the piston-sleeve I a clutch-hub, J, is firmly keyed, and it should be mentioned that the shaft A² passes loosely through the sleeve I and the cylinder-head E. The clutch-hub J resembles a smooth-faced pulley with a true cylindrical surface or rim, J². It is strongly made to resist compression applied to its surface. It has two sets of stout arms, J', which support the rim J² and integrally connect the rim and hub together; or the rim and hub may be joined together by a thin radial flange to take the place of the arms mentioned. The rim J² of the clutch J is preferably laid with steel or chilled, so that a durable surface is afforded, that may be polished and will remain so, unaffected by the frictional contact of the clutch-rollers $a'\ a$.

Inspection of Figs. 1 and 2 will show one of the radical changes of construction made in this engine from the patented engine, No. 344,339. It consists in making the cylinder itself revolve along with its heads upon the center shaft and have its smooth peripheral surface serve as a clutch-hub for contact of the clutching-rollers $a\ a'$. The outer face of the cylinder C is also hardened by chilling or laying with steel and polished to engage with the clutch-rollers and resist wear from such a contact of parts. The portion A, that has the appearance of a cylinder, as shown in Fig. 1, is only a shell, not a steam-receptacle, but an enveloping-jacket, which incloses the cylinder C. It is of such a relative diameter to the cylinder as to afford a space for the location of the clutching devices upon the inner surface of the stationary clutch-shell. This clutching mechanism will be fully explained in its order.

In the sectional view, Fig. 2, it will be noticed that there is a space allowed between the opposite sides of the cylinder-head E' and the clutch-hub J, and it will also be seen that the stationary clutch-shell A extends from the point $t$ about the center of width of the clutch-hub J to a point, $t'$, slightly past the center of length of the cylinder C.

In the space between the cylinder C and the clutch-hub J, above the axle A², a steam-passage, K, is formed, and in a vertical line below this live-steam passage K an exhaust-passage, K', is produced centrally within the stationary clutch-shell A. Integral webs $b\ b\ b'\ b'$ are formed at each side of the live-steam and exhaust passages K K', which are transverse dividing-walls in the stationary clutch-case A.

The webs or integral dividing-walls $b\ b$ and $b'\ b'$ join to produce a hub, E², which latter surrounds the sleeve-extension B' of the cylinder-head E' and forms a bearing for it. The hub E² has an annular steam-passage, N, formed in it, which is eccentric, being enlarged diametrically on the upper side to join the live-steam passage K by means of the perforations $n$, made vertically through the wall between them.

In the sleeve-extension B' of head E' the annular steam-passage $c$ is made, which is in effect a continuation of the annular steam-passage N of the clutch-case A. The steam-channel $c$ extends through the cylinder-head E', and connects with a similar annular steam-passage cored in the piston-hub B, the full black arrows indicating the passage of live steam in the figures where these passages are shown; and it may be here stated that the arrows shown in broken or dotted lines indicate the course taken by exhaust-steam toward and into the exhaust-steam conduit K', and thence out of the engine.

The induction of live steam into the engine through the piston-hub B, as stated, has for its object to prevent all end-pressure and consequent friction, as it will be seen that the steam will have equal pressure throughout the interior of the cylinder C and upon each end of the piston-hub, as well as through it.

The pistons C' of the cylinder C are perforated throughout their length, and these exhaust-passages are so located that they will communicate with the annular channel or exhaust-passage formed in the head E'. (See Fig. 2.) This method of construction will afford a continuous exhaust-conduit, which will not be affected by the changes of position of the exhaust-passages in the pistons C', owing to the rotation of the cylinder C, to which these pistons belong. In case it is necessary to take up slight wear of the joint between the head E' and interior moving parts, the set-screw $f$ may be drawn up, which will pull the sleeve I slightly endwise, and so tighten the surface of contact. This will hardly be necessary, in view of the slight wear of the parts, they being perfectly "balanced" against end-thrust, as before explained.

The stationary clutch-shell A, previously mentioned, extends in cylindrical form from the webs $b\ b\ b'\ b'$, to envelop about one-half of the length of the clutch-hub J and the cylinder C, the shell being thickened up to render it strong enough to withstand outer pressure applied on its inner surface.

In some cases, as in large engines, the shell A may be re-enforced by an I-shaped circular flange cast upon the outer surface of the shell over the clutch-rolls $a\ a'$, to resist their wedging action and consequent bursting strain.

The clutching devices are somewhat similar in form to those shown in patent of record, No. 344,339. They consist of a series of rollers, $a$, which are each mounted in the bracket-frame $a^2$, (see Fig. 11,) the rollers being pivoted at $a^5$ to revolve freely.

An integral rod, $a^4$, projects from the frame $a^2$ at right angles from its rear side, near the center of length of the same, and has sliding contact with the perforated boss $a^8$, which projects from the surface of the pad-plate $a^6$, this plate having elongated slots $a^7$ made through it to lock it to the inner surface of the stationary clutch-case A. A spiral spring, $a^3$, encircles the rod $a^4$, and by its resilience forces the bracket-frame and roller forward or from the pad-plate $a^6$.

Any suitable number of the bracketed rollers shown in Fig. 11 are affixed to the inner surface of the case A to locate them at spaced intervals thereon. (See Fig. 5.) In order to cause the roller $a'$ to bear upon the surface of the rim $J^2$ of the clutch-hub J, and also upon the peripheral surface of the cylinder C, the inclines or wedge-shaped projections $r$ are formed upon or secured to the case A, so as to engage the rollers $a'$ when shoved by the springs $a^3$, and thus force the rollers to bite upon the clutch-hub and cylinder, which will lock the cylinder fast to the case A, and this case A to the clutch-hub J also. All the inclines on the stationary clutch shell or case A slope in the same direction.

Adjacent to the edges $t\ t'$ of the stationary clutch-case A the cylindrical rings G G' are placed upon the unoccupied portions of the rim $J^2$ of the clutch-hub J and the cylinder C. These rings are made of similar thickness to the clutch shell A and are termed "clutch-disks." The clutch disks are provided with lateral flanges $G^2$, which are bent to clear the surface of the ends of the clutch-hub J and cylinder-head E, terminating in hubs $G^3$, which are perforated concentric to the disk-surfaces of a size to neatly fit the shaft $A^2$, upon which they are rigidly secured. The inner surfaces of the cylindrical portions or disks G have a clearance diameter equal to that of the stationary clutch shell A. The flanges $G^2$ may be made as arms to connect the disk-rims G G' to the hubs $G^3$; but we prefer to make them continuous in engines of medium size, so that they cover the interior working parts completely at the ends, to prevent entrance of dirt and afford a neat appearance to the engine. The disks G G' are furnished with a series of clutching-rollers, $a$, which are held in bracket-frames made exactly like those of the stationary clutch shell or case A, and are intended to operate in the same manner, with this exception, that the wedge-shaped projections or inclines made on the disks G G' are pitched to lock the rollers fast to the clutch-hub and cylinder in a direction opposite to that of the inclines on the clutch case A.

It will be evident from the foregoing description that the rotation of the cylinder C in one direction will lock the same to the stationary case A, and thus cause its pistons C' to act as rigid abutments, while the hub-pistons D, which may be pushed in an opposite direction, will lock fast to the clutch-disks G G', and by attachment of these disks to the shaft $A^2$ move the shaft or partially rotate it. Further, if the steam that is introduced between the locked pistons of the cylinder C and the loose hub-pistons D to move the latter is cut off by closure of a valve and introduced on the opposite side of the locked pistons C', the expansive force of this volume of steam will unlock the pistons C' and instantly lock those on the piston-hub B, which latter set of pistons D become the rigid abutments, and the released pistons C' will swing their full stroke to continue the rotative movement of the clutch-disks G G' and the attached shaft $A^2$.

The cylinder-head E, which contains the main valve of the engine, as well as the live-steam and exhaust ports and passages to and from the same, is shown in Fig. 2 in section through its longitudinal center, and in Fig. 5 a face view is given that is adjacent to the cylinder C.

The portion P of the head E, which forms the seat for the valve H, is shown removed from the head, in order to exhibit the construction of the ports and steam passages, as will be seen in Figs. 4, 6, and 10.

In Figs. 4 and 6 the face of the cylinder-head E exhibits two live-steam ports, c c, upon each side of the central orifice in which the shaft A² is placed, a pair of these ports being placed upon each side of a round exhaust-port, L', which is made to line with the exhaust-passages L, that are formed in the pistons C'. Upon each side of the live steam ports c the exhaust-ports L are located. The latter-named are of the same capacity as the ports c, and all of these exhaust and live steam ports are rectangular radial slots through the head, except the center exhaust passage, L', before mentioned.

The live steam and exhaust ports c L are extended as passages into the head E, and at a proper point are given a quarter turn or twist to cause them to lie with the exit-ports at a right angle to the ports in the face of the head E, just described. The head E is bored out to receive a cylindrical ring-valve, H, which is made to fit steam-tight and slide therein, this bore being concentric with the center of the shaft A².

The terminal ports of the steam-passages c L are cut through the cylindrical wall of the head into which the ring-valve H slides, as just stated. The half-turn of these passages disposes them so that an exhaust-passage will lie directly opposite to and parallel with a live-steam port, the live-steam and exhaust ports alternately changing position, so that in each parallel row of ports there will be two exhaust-ports and two live-steam ports alternating with each other.

The core or plug P, over which the ring-valve H slides, is provided with four live-steam passages and four exhaust-passages formed in its body. The live steam passages all enter, respectively, the ports 3 4 5 6 in the face of the head, (see Fig. 4,) and these ports are connected to passages which twist to intersect a series of ports located in the periphery of the plug P, these latter-named ports corresponding in position to the live-steam ports in the head E. The exhaust-ports all lead out to the opposite end of the plug P and connect to the annular exhaust-channel L made in the cap-plate E², which is fastened to the end of the cylinder-head E, as shown in Fig. 2. The exhaust-channel is also shown in Fig. 14, which is a face view of the cap E².

The ring-valve H (shown detached in Figs. 8 and 9 and in position in Fig. 2) consists of a cylindrical ring of steel or other hard metal. It is of such a thickness as to have its outer and inner surfaces fit with steam-tight joints the smooth bore of the cylinder-head E and the peripheral surface of the plug P.

The valve H should be made to slide freely endwise, and is of such a length proportionally to the length of the channel in which it moves that it will be slightly shorter than said channel, so that a steam-space at each end of the stroke of the valve will be allowed to exist.

In large engines the valve H may be provided with packing-rings that are formed of elastic metal, preferably hardened, and inserted into grooves cut in the inner and outer surfaces of the valve near each of its ends, so that the elasticity of these packing-rings will cause them to regain their normal shape after they have been forced into the retaining-grooves mentioned.

The valve H has four elongated slots cut through its body in line with its edges, and central between these edges, these slots forming ports which are adapted to register with the ports in the cylinder-head E and the core or plug P when it is at either end of its stroke.

In the face of the cylinder-head E there will be seen six small ports, u u u u S S. These are respectively exhaust and live ports, which are connected to the live-steam and exhaust passages c L, that are made in the cylinder-head E and register with the ports in the main valve H—that is to say, the exhaust-passages that extend from the ports u u u u communicate with the exhaust-passages L, and live-steam passages c are intersected by the live-steam conduits which are extensions of the live-steam-ports S. The small ports u u S S are intended to introduce steam to cause the main valve H to slide endwise and line successively with the front and rear row of ports in the head E and plug P.

In the valve H (see Figs. 8 and 9) there are shown two small excavations, v, on the face of the valve at opposite points and near opposite edges of the same. The cavities v are of sufficient depth to allow small steam-ports v' to be formed in the body of the valve in the nearest edges inwardly to enter the cavities, so that steam which enters the cavities v will escape through the ports in the edges of the valve, it being conveyed under the bridges v² left standing between the edges of the cavities and the adjacent valve edges, as shown in Fig. 9, which is a longitudinal view, in section, of the valve H.

In Figs. 2 and 6 the auxiliary valve M is shown. This valve is designed to control the entrance and discharge of steam through the ports u u S S', and is in fact the device by which the steam is caused to automatically change the position of the main valve H in harmony with the hub-pistons D, to which the auxiliary valve M is connected so as to move with them. The auxiliary valve M consists of a simple ring of steel or other hard metal that has its opposite sides parallel and its periphery made a true circle. The diameter of the ring M is proportioned to that of the hub-piston B, so that it may be seated in a recess cut into the end of the hub-piston that is adjacent to the cylinder E and have its face that bears on this head ground to a steam-tight joint therewith.

The auxiliary valve M rests on springs in its seat to cause it to have a yielding contact with the cylinder-head E, and it also has a steam-passage, $p$, cut through it to allow steam from the annular steam-passage in the piston-hub B to pass through the valve and into the live-steam ports S S' when the hub pistons D are at either end of their stroke. (See Fig. 2.) There is also made in the surface of the auxiliary valve M an elongated channel, $p'$, (see Figs. 2 and 6,) cut into, but not through, the face of the valve that is in running contact with the cylinder-heads E, the position of this channel $p'$ being such in relation to the exhaust-passages $u$ $u$ that at either end of the stroke of the hub-piston B the cavity or channel $p'$ will cover and connect the two exhaust-passages so that the exhaust-steam will escape from the chamber at the end of the main cylinder-valve H toward which the valve is about to slide.

When one set of the exhaust-ports $u$ $u$ are covered by the elongated channel $p'$ to form a continuous exhaust, the live-steam port S, that is located on the opposite side of the valve-seat, (that is, the face of the cylinder-head E,) will be in line with the live-steam passage in the auxiliary valve M. Live steam will enter the chamber at the end of the main cylindrical valve H through the small steam-port $v'$, that is in the end of the valve H and is brought into connection with the main live-steam passage by the cavity $v$, of which the small steam-port $v'$ is a lateral extension, the cavity $v$ being at this instant over the live-steam port $c$ in the cylinder-head E. The pressure of live steam will compress the steam that is in the chamber at the end of the main valve H, and thus cushion its longitudinal movement.

The operation just described applies to the movement of the valve in either direction, it being understood that the small live-steam port on the opposite edge of the valve H and its connected steam-cavity will be in service.

The amount of live steam introduced through the auxiliary valve M will be cut off when the main slide-valve H is pushed endwise far enough to remove the cavity $v'$ from over the live-steam port $c$, and locates it under a metal bar between the live-steam port $c$ and the exhaust-port parallel to it, so that just enough steam is admitted to throw the valve and effectually cushion it.

The engine is provided with a cut-off valve, R, (see Fig. 2,) which is designed to cut off the steam from the main valve H at any predetermined point in the rotation of the pistons of the cylinder P and those of the hub B.

The valve R is annular in form and has a flange, R', made integral with the ring-shaped base and at right angles to it. It has two steam-ports, $R^3$, cut through the flange R' at opposite points, these ports conforming in position to the live-steam ports $c$ in the plug P of the cylinder-head E, which convey steam from the annular steam-passage made endwise through the body of the hub-piston D to the inner surface of the main slide-valve H, and through its ports into the twisted passages in the cylinder E outside of the valve H, and thence through the live-steam ports $c$ $c$ in the face of the cylinder-head E into the cylinder C, as shown in Fig. 2.

The dimensions of the two ports $R^3$ will regulate the amount of steam transmitted through them, so that the volume may be graduated by making these passages large or small to increase or lessen the quantity supplied to the valve.

The valve R is made to revolve with the piston-hub B by the insertion of a guide-rod, $o$, in a perforation made in the swell or boss $o'$, that projects from the surface of the hub B at a proper point to line with the guide-rod $o$, which latter is secured rigidly in the edge of the base of the valve R, so as to project from it in a line at right angles to the face $o^3$ of the flange R'.

It will be noticed by inspection of Fig. 4 that in the face of the cylinder-head E the live-steam ports 3 4 are separated from the opposite steam-ports, 5 6, by two bars of metal, 7 8. These bars cut off the steam absolutely from the main slide-valve H when the revolution of the hub-piston B carries the ports $R^3$ of the valve R over these bars, so that at that time the engine is working by the expansive energy of the live steam previously transmitted through the ports $R^3$, and thence through the valve H into the cylinder C.

It is important at times to be able to use steam without the cut-off valve R, so that a full direct pressure will be had upon the pistons throughout the entire stroke of the same— as, for instance, when first starting the engine, particularly when it is cold, and the inertia of all machinery it drives is to be overcome. To suspend the use temporarily of the cut-off valve M, a pusher-rod, $o^4$, is loosely inserted in a perforation made lengthwise in the core P of the cylinder-head E to allow its end $o^6$ to bear upon the flange-surface of the cut-off valve. The other end, $o^7$, of the rod $o^4$ is in contact with the annular flange $d$, that is located inside the clutch-disk, near the cap plate $E^2$ of the head E. This flange $d$ is connected to another similar flange, $d'$, by the parallel rods $d^2$, (see Fig. 2,) so that a pressure on the flange $d'$ to move it inwardly will move the valve R off of its seat upon the head E, and thus permit a free flow of steam through a proper pair of steam-ports in the head E.

In Fig. 1 will be seen the actuating-lever V, that is pivotally supported upon the bracket-plate V', the forked lower end of the lever engaging the flange $d'$ to move the valve R, the adjustment open or closed being maintained by the insertion of a pin through the perforations $d^3$ made in the lever and plate V', near its arched upper edge. The force of the live steam exerted upon the cut-off valve will carry it back to its normal position on the head E when the lever V is reversed to permit it.

In order to relieve the engine of condensed water, a drain-pipe, U, is inserted to tap the lowest point in the live-steam-inlet pipe K. (See Fig. 3.) This is conducted diagonally downward and out through the case A to allow the waste-water cock U' to be opened when necessary and blow off the water of condensation.

In operation we will suppose the pistons D D to be in position shown in Fig. 6, or between the exhaust-ports L and the live-steam ports c, this being the extremity of piston-stroke. The auxiliary valve M will now reverse the main valve H and admit steam, which escapes from the ports c, between the cylinder-pistons, which cover the round exhaust-port L'. (Shown in the figure between the steam-ports.) The pressure of steam will instantly lock the cylinder to the clutch-case, and thus render the pistons C' rigid abutments. The hub-pistons D are driven forward and pass the exhaust-ports L, and continue this movement until the auxiliary valve M reverses the position of the main cylindrical ring-valve H to admit steam on the other side of the traveling hub-pistons D, thus locking them to the clutch-hub J and stationary case A so that these hub-pistons are held rigid and the cylinder, with its pistons, swings around the piston-hub B. The periodical alternate rotation of the piston-hub and cylinder in the same direction will transmit their motion by locking engagement to the clutch-disks G G' alternately, and, as the successive movement of the hub-pistons and cylinder-pistons is rapid, the continuous revolution of the engine-shaft $A^2$ is effected by the step-by-step motion of the pistons, as stated. By a proper relative adjustment of the auxiliary valve with the main slide-valve the exhaust is held between the stationary piston and the moving ones for a portion of the stroke of these pistons, so that the forward movement near the end of the stroke of either set of moving pistons is cushioned to prevent jar when the change of locking contact of the moving parts with their clutch devices is made.

In order to render more effective the cushion of exhaust-steam between the stationary and moving pistons, the live-steam ports c are allowed to introduce steam for an instant of time until the adjacent exhaust-ports L are opened by the uncovering of these ports when the hub-pistons D pass them. The main valve H will remain without change until the moving pistons have approached the stationary ones, and an elastic cushion that aids to release the locked pistons is maintained until the main valve moves to change the steam-inlets and opens the exhaust at the same time.

In order to render the engine reversible, we provide a style of reversible clutch shown in Figs. 12 and 13. A series of these clutches are used to take the place of those shown in previous views, and as these reversible clutches are all alike a description of one clutch will suffice for all.

A bracket-frame is provided to give support to a roller, w, and permit it to revolve in the bracket-frame. Two rods, 11, project at opposite sides of the bracket-frame in the same axial line. These rods slide in holes made in flange Q', which projects from the side of ring Q. The ring Q lies edgewise in the space between the clutch-case and the cylinder, or in the clutch-disks in a similar space, the roller w having a contact with the wedge-shaped inclines 12. (See Fig. 12.) These inclines are lowest at their point of junction midway between their high terminals, so that the roller w will lock if moved in either direction to ride either incline and wedge between it and an opposed cylinder or clutch-hub. A series of these rollers w are employed in lieu of the single incline self-adjusting rollers previously described and are placed at spaced intervals on the clutch-case A and disks G G' to engage the integral double inclines 12, thereon located.

Suitable arms are made to project from the side of the case A and clutch-disks, which may be connected together and be actuated by a lever to throw the rings around and bring either set of the inclines 12 into use. It is evident that the change of position of the rollers by a rotative movement of their supporting-rings Q will cause the engine to run forward or backward, as may be desired.

From the foregoing description of the mechanism of this engine it will be apparent that the working parts are simple, compact, and substantial, and that steam may be cut off at any predetermined point in the travel of its pistons to work expansively a portion of the stroke, and that the cut-off may be thrown out of service instantly when full pressure is needed, as in starting a cold engine. A further advantage consists in the provision of steam-induction in a manner to obviate all end-thrust of the working parts, and thus avoid undue frictional resistance of the surfaces that have sliding contact.

The construction of the main slide-valve H in the manner indicated renders it perfectly balanced and cushioned, and thus avoids all percussive action, as well as improper friction of its sliding surfaces.

The co-operation of the auxiliary valve M gives the main valve H an automatic endwise movement at just the correct instant of time to change the steam induction and eduction in relation to the moving pistons, so as to cushion the moving pistons, and also alternately lock and advance the cylinder and hub-pistons to give rotary motion to the shaft.

In large engines we may prefer to form a tread for the clutch-rollers upon the cylinder-heads instead of the shell of the cylinder itself. This will permit the cylinder to be made lighter, with flanges to connect to the heavy heads.

Other slight alterations in the form of the working parts of this device may be made without exceeding the manifest scope of our invention; hence we do not wish to limit ourselves to the exact forms herein shown; but, Having fully described our invention, what we claim as new, and desire to secure by Letters Patent, is—

1. In an engine, a cylindrical ring-valve mounted in the cylinder-head and having ports cut through it and adapted to move by steam-pressure endwise on its seat, substantially as set forth.

2. In an engine, a cylindrical ring-valve mounted in the cylinder-head and having ports cut through it in line with each other endwise and adapted to slide upon a seat by pressure of steam on its ends, substantially as set forth.

3. In an engine, a cylindrical ring-valve mounted in the cylinder-head and having a series of oblong ports cut through it in a line with its edges and near its center of length, the valve being adapted to move endwise on its seat by direct steam-pressure on each end alternately, substantially as set forth.

4. In an engine, a cylindrical ring-valve mounted in the cylinder-head and having a series of elongated slots made through it at intervals, the slots being located near the center of length of the valve to serve as ports, the valve being adapted to reciprocate periodically endwise on its seat by direct steam-pressure, substantially as set forth.

5. In an engine, a valve having its body of a cylindrical form, ports cut through the body in line with each other and parallel to the ends of the valve, and cavities made in the body that are intersected by holes formed transversely of the body inwardly from each end, substantially as set forth.

6. In an engine, the combination, with a main valve of cylindrical form and a cylindrical head that is a valve-chest, ports in the valve, and ports and steam-passages in the head with which the cylinder-valve ports may register, of exhaust and live steam ports in the head made to register with an auxiliary ring-valve, and an auxiliary ring-valve adapted to be rotatively moved to admit and discharge the steam which slides the main valve endwise and cushions it at each end, substantially as set forth.

7. In an engine, an auxiliary ring-valve rotated by the piston-hub and controlling steam which operates a main cylindrical valve to reciprocate it periodically, substantially as set forth.

8. In an engine, the combination, with a cylindrical main valve, a cylinder-head that is a valve-seat, live-steam and exhaust ports in the face of the head that are continued as passages in the head and made to register with ports in the valve, and elongated ports in the main valve that are in line with the ends of the valve and cut through the valve near its center of length, of a shaft, a piston-hub mounted on this shaft, and an auxiliary ring-valve that is moved by the piston-hub to control steam which reciprocates the main valve, substantially as set forth.

9. In an engine, the combination, with a cylindrical main valve, a cylinder, pistons affixed to the cylinder, a cylinder-head with exhaust and live steam passages in it, and another cylinder-head with exhaust and live steam passages in it and adapted to receive a cylindrical valve, of a cylindrical ring-valve having ports in it to register with exhaust and live steam passages in the cylinder-head, a center shaft, a hub with radial pistons on it that lie alternately opposite the cylinder-pistons, and a means of controlling steam to reciprocate the cylindrical ring-valve which regulates the rotary movement of the cylinder and hub pistons, substantially as set forth.

10. In an engine, the combination, with a hub and pistons integral with this hub, of an auxiliary ring-valve doweled to the hub at one end and seated in the recessed end of the hub, substantially as set forth.

11. In an engine, an auxiliary valve having a live-steam port cut through its body endwise and a channel cut in its face diametrically opposite the live-steam ports to join a live-steam passage, and an exhaust-passage with which the groove is made to register, substantially as set forth.

12. In an engine, the combination, with a cylinder-head, which is also a valve-chest and has live-steam and exhaust passages and ports formed in it, of an auxiliary valve, a hub, pistons on the hub, a cylinder, pistons on the cylinder, and exhaust-passages made endwise through these pistons, substantially as set forth.

13. In an engine, a cylinder having pistons or abutments projecting radially toward its diametrical center, which pistons are perforated throughout the length of their bodies, substantially as set forth.

14. In an engine, a clutch-hub attached to a projecting sleeve and its hub, which has radial pistons projecting from its peripheral surface, substantially as set forth.

15. In an engine, the combination, with a piston-hub, pistons that are formed radially at opposite points on this hub, and an integral sleeve that extends from one side of the piston-hub, of a clutch-hub that is provided with radial arms or flanges and a hard cylindrical rim secured to or integral with the radial arms, substantially as set forth.

16. In an engine, the combination, with a piston-hub, pistons formed or affixed to this hub, and a sleeve projecting from one side of the piston-hub, of a clutch-hub provided with arms and a cylindrical rim, a clutch-disk, a series of wedge-shaped inclines on the inner surface of this disk, and a series of bracket and spring actuated rollers that are adapted to lock the clutch-hub and clutch-disk together, substantially as set forth.

17. In an engine, the combination, with a clutch-hub of a stationary disk and locking devices carried by the clutch-disk, of a stationary clutch shell or case and locking devices secured to the stationary clutch-case to lock the clutch-hub, substantially as set forth.

18. In an engine, the combination, with a stationary clutch shell or case, of a clutch-hub, a center shaft, and two clutch-disks attached to the shaft to rotate with it, substantially as set forth.

19. In an engine, the combination, with a stationary clutch case or shell, a cylinder, a clutch-hub, and a series of locking devices secured to the stationary clutch case to lock it to the clutch-hub and cylinder, of a central shaft, two clutch-disks attached by their hubs to the shaft, and a series of locking devices attached to these clutch-disks that are adapted to lock to the clutch-hub and cylinder oppositely to the locking devices secured to the stationary case, substantially as set forth.

20. In an engine, the combination, with a base-plate, bracket-stands, and boxes to support a shaft, of a shaft, a stationary clutch-case, and two clutch disks secured to the shaft, substantially as set forth.

21. In an engine, the combination, with a stationary clutch-case, a base-plate, two bracket-stands furnished with boxes, and a shaft supported to rotate in these boxes, of two series of locking-rollers secured in place on the inner surface of the stationary clutch-case near each end of the case, substantially as set forth.

22. In an engine, the combination, with a base-plate, bracket-arms projecting from the base-plate to give revoluble support to a shaft, and a shaft, of a stationary clutch-case secured to the base-plate, and two sets of self-adjusting locking-rollers, and an equal number of wedge-shaped inclines adapted to engage the rollers, the rollers and inclines being located near the ends of the stationary clutch case in a manner to lock in the same direction, substantially as set forth.

23. In an engine, a stationary clutch-case having live-steam and exhaust passages formed in it near its center of length and breadth, substantially as set forth.

24. In an engine, the combination, with a stationary clutch-case and live steam and exhaust conduits formed in it near its center, of two sets of locking-rollers and two sets of inclines, all secured to the stationary clutch-case to lock on a clutch-hub and cylinder in the same direction, substantially as set forth.

25. In an engine, the combination, with a stationary clutch-case, a base-plate, a shaft revolubly supported upon the base-plate, to be nearly central with the stationary clutch-case considered diametrically, and clutch-disks secured by their hubs to this shaft, of a cylinder, pistons on this cylinder, a hub with radial pistons projecting from it to engage the inner surface of the cylinder, the piston-hub and cylinder being concentric with each other and the shaft on which they are loosely mounted, a clutch-hub, and locking-rollers secured to the inner surfaces of the clutch-disks and stationary clutch-case to lock upon the clutch-disks and cylinder, substantially as set forth.

26. In an engine, the combination, with a stationary clutch-case, a cylinder, a clutch-hub, and spring-actuated rollers and inclines that are adapted to lock upon the surface of the clutch-hub and cylinder in one direction, of two clutch-disks, a center shaft supported to rotate with the clutch-disks and secured to them, and a set of self-adjusting spring-actuated rollers and inclines that are secured to the clutch-disks on their inner surfaces opposite the peripheries of the cylinder and clutch-hub, so as to lock upon them in a direction opposite to the locking action of the rollers mounted on the stationary clutch-case, substantially as set forth.

27. In an engine, a ring-shaped cut-off valve adapted to control the flow of steam through the cylindrical main valve of a concentric-piston engine, substantially as set forth.

28. In an engine, a ring-shaped cut-off valve having steam-ports cut through it and adapted to cut off steam from the cylindrical main slide-valve of a concentric-piston engine, substantially as set forth.

29. In an engine, a ring-shaped cut-off valve having live-steam ports cut through it and adapted to slide on a guide-bar, so as to throw it into or out of service as a cut-off, substantially as set forth.

30. In a steam-engine, the combination, with a cylinder-head having steam-ports in it and a main cylindrical slide-valve, of a ring-shaped cut-off valve that is adapted to cut off steam from the main cylindrical slide-valve of a concentric-piston engine, substantially as set forth.

31. In an engine, the combination, with a cylinder-head having steam ports and passages in it, a main cylindrical ring-valve that slides in a channel formed in the cylinder-head, and an auxiliary valve that controls the reciprocal movement of the main slide-valve, of a ring-shaped cut-off valve adapted to cut off steam from the main cylindrical slide-valve of a concentric-piston engine, substantially as set forth.

32. In an engine, the combination, with a cylinder, a cylinder-head having steam passages and ports formed in it, and an annular channel to receive a cylindrical ring main slide-valve, a cylindrical ring-valve having ports cut through it to register with the steam-passages in the cylinder-head, and an auxiliary annular valve that controls the influx and discharge of steam to actuate the main slide-valve reciprocally, of a ring-shaped cut-off valve adapted to cut off steam from the main slide-valve at any point in the revolution of the cylinder and hub pistons of a concentric-piston engine, substantially as set forth.

33. In an engine, the combination, with a cylinder, of a cylinder-head having an annular live-steam passage through it adapted to mate a similar passage in a hub-piston, an annular exhaust-channel which communicates with longitudinal exhaust-passages in pistons of the cylinder, and two diametrically-opposite pistons formed upon or secured to the inner surface of the cylinder, substantially as set forth.

34. In an engine, the combination, with a cylinder, of a cylinder-head that has a cylindrical slide-valve located in it, a cylindrical slide-valve, and steam and exhaust passages in the head and valve, and another cylinder-head secured to the opposite end of the cylinder and provided with live-steam and exhaust passages in it, substantially as set forth.

35. In an engine, the combination, with a stationary clutch-case, of a revolving cylinder and integral live-steam and exhaust conduits formed in the clutch-case to register with an attached head of the cylinder, substantially as set forth.

36. In an engine, the combination, with a stationary clutch-case, a base-plate, and a shaft revolubly supported on the base-plate, of integral live-steam and exhaust passages formed in the stationary clutch-case, a cylinder supported to revolve in the clutch-case, a hub-piston concentrically located in the cylinder, a cylinder-head adapted to hold a cylindrical slide-valve and convey steam to and through it previous to its admission into the cylinder, and another cylinder-head furnished with a live-steam passage that is made to connect with the integral live-steam passage in the stationary clutch-case, and an exhaust-channel that communicates with the exhaust-conduit made in the clutch-case, substantially as set forth.

37. In an engine, a hub-piston having an annular live-steam passage formed in it from one end to the other, substantially as set forth.

38. In an engine, a hub-piston having two opposite pistons, each piston provided with self-adjusting packing-strips, the hub also having an annular channel for live steam formed lengthwise of its body from end to end, substantially as set forth.

39. In an engine, the combination, with a stationary clutch-case, of a series of double inclines so disposed as to lock a series of spring-actuated rollers upon a cylinder and clutch-hub from motion either forward or backward, substantially as set forth.

40. In an engine, the combination, with a stationary clutch-case and clutch-disks that revolve with a shaft, of a cylinder, a clutch-hub, and a series of spring-actuated locking-rollers adapted to lock the clutch-case and clutch-disks fast to the cylinder and clutch-hub and cause a rotary motion of the shaft in either a forward or backward direction, as may be desired, substantially as set forth.

41. In an engine, the combination, with a stationary clutch-case, two clutch-disks, and double-inclined planes formed on the inner surface of the clutch-case and disks, of a cylinder, a clutch-hub, and a series of spring-actuated locking-rollers supported on rings to permit the rollers to be moved and engage either set of inclines, substantially as set forth.

42. In an engine, the combination, with a clutch-disk, a stationary clutch-shell, a cylinder, and a clutch-hub, of a series of locking devices adapted to lock the working parts and run the engine-shaft in a forward or rearward direction, substantially as set forth.

43. In an engine, a series of spring-actuated rollers adapted to lock the stationary clutch-shell and rotary clutch-disks of a concentric-piston engine upon the cylinder and clutch-hub in a manner to allow the motion of the engine to be reversed, substantially as set forth.

44. In an engine, a cylindrical main ring-valve that is moved by steam and controlled by an auxiliary valve, substantially as set forth.

45. In an engine, an auxiliary valve to control a main cylindrical valve, said auxiliary valve having one steam-passage through it and an exhaust-channel formed on its face, substantially as set forth.

46. The combination, with a cut-off valve, of a pusher-rod, two rings connected by parallel rods, and a lever to slide the cut-off valve, substantially as set forth.

47. The combination, with a cut-off valve having a ring-shaped body and two steam-ports cut through it, and a guide-rod attached to this valve, said rod engaging a rotary piston-hub to transmit rotary motion to the cut-off valve and allow the cut-off valve to slide longitudinally, of a lever mechanism to move the cut-off valve endwise off of its seat and secure it in such a position at will, substantially as set forth.

48. In an engine, the combination, with a stationary clutch shell or case, a clutch-hub, a shaft held to revolve upon bracket-stands, and a base-plate that supports and is attached to the stationary clutch-case and bracket-stands, of a cylinder, a hub-piston, radial pistons fixed upon the cylinder and hub pistons to be alternately opposite each other, a cylindrical main slide-valve located in one of the cylinder-heads, an auxiliary ring-shaped valve that controls steam employed to operate the main valve, and a cut-off valve of annular form adapted to cut off steam from the main valve to work the engine by expansion of steam at any predetermined point in the stroke of the concentric pistons, substantially as set forth.

49. The combination, with a cylinder having inwardly-projecting wings or abutments and a hub having outwardly-projecting wings or abutments, of clutching devices for alternately locking the cylinder and hub to a shaft.

50. The combination, with a hub and a concentric cylinder surrounding same, the hub having outwardly-projecting wings or abutments, the outer edges of which rest in close contact with the inner face of the cylinder, and a cylinder having inwardly-projecting wings or abutments resting in close contact with the outer face of the hub, of clutching devices for alternately locking the cylinder and hub to a shaft.

51. An engine having piston-wings attached to the hub and to the cylinder, which alternately form abutments and moving pistons, which pistons make a stroke forward, then form abutments, and the former abutments become moving pistons, which make strokes forward successively and changing their position from a fixed point indefinitely.

In testimony whereof we have signed this specification in the presence of two subscribing witnesses.

ABNER D. BAKER.
FRANCIS P. HUYCK.

Witnesses:
JONATHAN HUNT,
JOHN CUNNINGHAM.